US008286543B2

(12) United States Patent
Allardin

(10) Patent No.: US 8,286,543 B2
(45) Date of Patent: Oct. 16, 2012

(54) VALVE ASSEMBLY FOR AN ACTUATING DEVICE

(75) Inventor: Jean Allardin, Laval (CA)

(73) Assignee: Starcyl Canada Inc., Laval (CA)

( * ) Notice: Subject to any disclaimer, the term of this patent is extended or adjusted under 35 U.S.C. 154(b) by 811 days.

(21) Appl. No.: 12/516,727

(22) PCT Filed: Jun. 26, 2008

(86) PCT No.: PCT/CA2008/001220
§ 371 (c)(1),
(2), (4) Date: May 28, 2009

(87) PCT Pub. No.: WO2009/000088
PCT Pub. Date: Dec. 31, 2008

(65) Prior Publication Data

US 2010/0058753 A1 Mar. 11, 2010

Related U.S. Application Data

(60) Provisional application No. 60/946,240, filed on Jun. 26, 2007.

(51) Int. Cl.
*F15B 13/042* (2006.01)
*F16K 25/00* (2006.01)

(52) U.S. Cl. ........................................... 91/286; 91/288

(58) Field of Classification Search .................... 91/286, 91/287, 288, 311, 453; 92/6 R
See application file for complete search history.

(56) References Cited

U.S. PATENT DOCUMENTS

| | | | | |
|---|---|---|---|---|
| 5,440,968 | A * | 8/1995 | Sekine | 92/6 R |
| 6,095,028 | A | 8/2000 | Lämas et al. | |
| 7,281,464 | B2 | 10/2007 | Weiler, Jr. et al. | |

FOREIGN PATENT DOCUMENTS

| | | | |
|---|---|---|---|
| JP | 8 014 410 | A | 1/1996 |
| WO | WO-97/41993 | A1 | 11/1997 |

* cited by examiner

*Primary Examiner* — Thomas E Lazo
(74) *Attorney, Agent, or Firm* — Goudreau Gage Dubuc; Gonzalo Lavin

(57) ABSTRACT

A valve assembly for controlling the flow of pressurized fluid supplied to an actuating cylinder having a piston driven by the pressurized fluid along a stroke path therewithin, the pressurized fluid being applied to alternative driving sides of the piston. The valve assembly comprises a first and a second valve pistons, which cooperate to block the supply of pressurized fluid to the current driving side of the piston when the piston reaches the end of its stroke path, thereby limiting the pressure of the pressurized fluid supplied to the driving side to a level reduced compared to a pressure level applied to drive said piston. If a leak occurs within the actuating cylinder at the end of the stroke path of the piston, it will be at the reduced pressurized fluid pressure.

17 Claims, 10 Drawing Sheets

VALVE ASSEMBLY FOR AN ACTUATING DEVICE

CROSS-REFERENCE TO RELATED APPLICATIONS

This application is a National Entry Application of PCT application no PCT/CA2008/001220 filed on Jun. 26, 2008 and published in English under PCT Article 21(2), which itself claims priority on U.S. provisional application Ser. No. 60/946,240, filed on Jun. 26, 2007. All documents above are incorporated herein in their entirety by reference.

FIELD OF THE INVENTION

The present invention relates to a valve assembly for controlling the supply of actuating fluid to an actuating device.

BACKGROUND OF THE INVENTION

As well known in the art, aluminium is manufactured through an electrolytic process by dissolving alumina, a composite extracted from the bauxite ore, in a high temperature bath of molten cryolite salt, such as between 950 and 1000 degrees Celsius or 1742 to 1832 degrees Fahrenheit. The molten cryolite salt is contained in a carbon-lined steel pot with carbon blocks suspended in the pot sending electric current through the salt bath, causing the alumina to break apart. The molten aluminium metal then settles to the bottom of the pot and since the top surface of the molten metal is generally exposed to atmosphere, it cools down, typically from 400 to 500 degrees Fahrenheit to 300 degrees Fahrenheit, resulting in formation of a crust. When additional material, such as alumina powder, is to be added to the pot, a device needs to be driven into the pot to break the crust formed thereon. Typically, a large number of pots are in operation at one time during the smelting process and one or more crust breaking devices propelled by pneumatically-driven actuating devices, such as pneumatic piston-cylinders, are positioned above each pot. An actuating fluid, e.g. compressed air, is typically supplied to the actuating device at a pressure of about 100 pounds per square inch (psi), thus enabling motion of the crust-breaking device.

Since the crust layers to be broken may vary in thickness, the actuator systems, i.e. the cylinders, are required to be powerful and typically are of large diameter (8 to 10 inches or 20 to 25 centimeters). Driving the working piston of each actuating device thus requires a large amount of actuating fluid and implementation of these systems leads to high demand for actuating fluid and as a result to substantial manufacturing costs. Moreover, the actuating devices typically operate in extreme environments, which result from diverse factors such as high temperatures, abrasive powders such as aluminum oxide and gases such as fluorine, and continuous use twenty four hours a day. These conditions impact the working life of cylinder components, especially that of sealing assemblies used to prevent actuating fluid leakage around the piston rod at various pressures. Indeed, the seals wear out faster in corrosive and high pressure environments, thus allowing fluid to leak within the cylinder. Since the crust-breaking operation is continuous and a smelter pot accnot be easily stopped and restarted due to potential solidification of metal in the pots, the volume of actuating fluid consumed by the smelter must be increased in order to compensate for any leakage and maintain the cylinder pressure at a level sufficient for adequate operation of the cylinder, proving expensive and wasteful in terms of energy usage, especially in the case of currently used large diameter cylinders.

What is therefore needed, and an object of the present invention, is a control system, more specifically a valve assembly, which controls the supply of actuating fluid to the actuating device, thus bringing down the consumption of actuating fluid to the minimum level required for operation of the actuating device.

SUMMARY OF THE INVENTION

More specifically, in order to address the above and other drawbacks, there is provided a valve assembly for controlling the supply of pressurized fluid to a piston slidably disposed within an actuating cylinder for movement along a longitudinal axis thereof between a rest position where the piston is adjacent a first end of the cylinder and an extended position where the piston is adjacent a second end of the cylinder. The valve assembly comprises a first passage provided at the first end for enabling a flow of the fluid within the cylinder during operation, a pressure of the fluid applying to alternative driving sides of the piston for alternatively moving the piston between the rest position and the extended position. The valve assembly also comprises a first valve piston mounted at the first end adjacent the first passage for movement along a direction substantially parallel to the axis, the first valve piston comprising a first surface and a projecting member extending away from the first surface towards the second end along the direction. A second valve piston is mounted adjacent the first valve piston for movement along the direction and comprising a second surface adapted to cooperate with the first surface and a sealing member is positioned adjacent the first passage and operatively connected to the first valve piston for movement therewith along the direction. Upon reaching the rest position the piston contacts the projecting member for propelling the first valve piston along the direction towards the second valve piston and abutting the second surface against the first surface, thereby moving the sealing member in alignment with the first passage for providing a seal at an interface between an outer surface of the sealing member and an inner surface of the first passage and stopping the fluid flow. When the piston is moved from the rest position to the extended position, the fluid drives the abutting first and second valve pistons along the direction towards the second end and brings the second surface out of abutment with the first surface, thereby moving the sealing member out of alignment with the first passage and releasing the seal for enabling the fluid flow.

Other objects, advantages and features of the present invention will become more apparent upon reading of the following non-restrictive description of specific embodiments thereof, given by way of example only with reference to the accompanying drawings.

DETAILED DESCRIPTION OF THE ILLUSTRATIVE EMBODIMENTS

The present invention is illustrated in further details by the following non-limiting examples.

Figure 1:
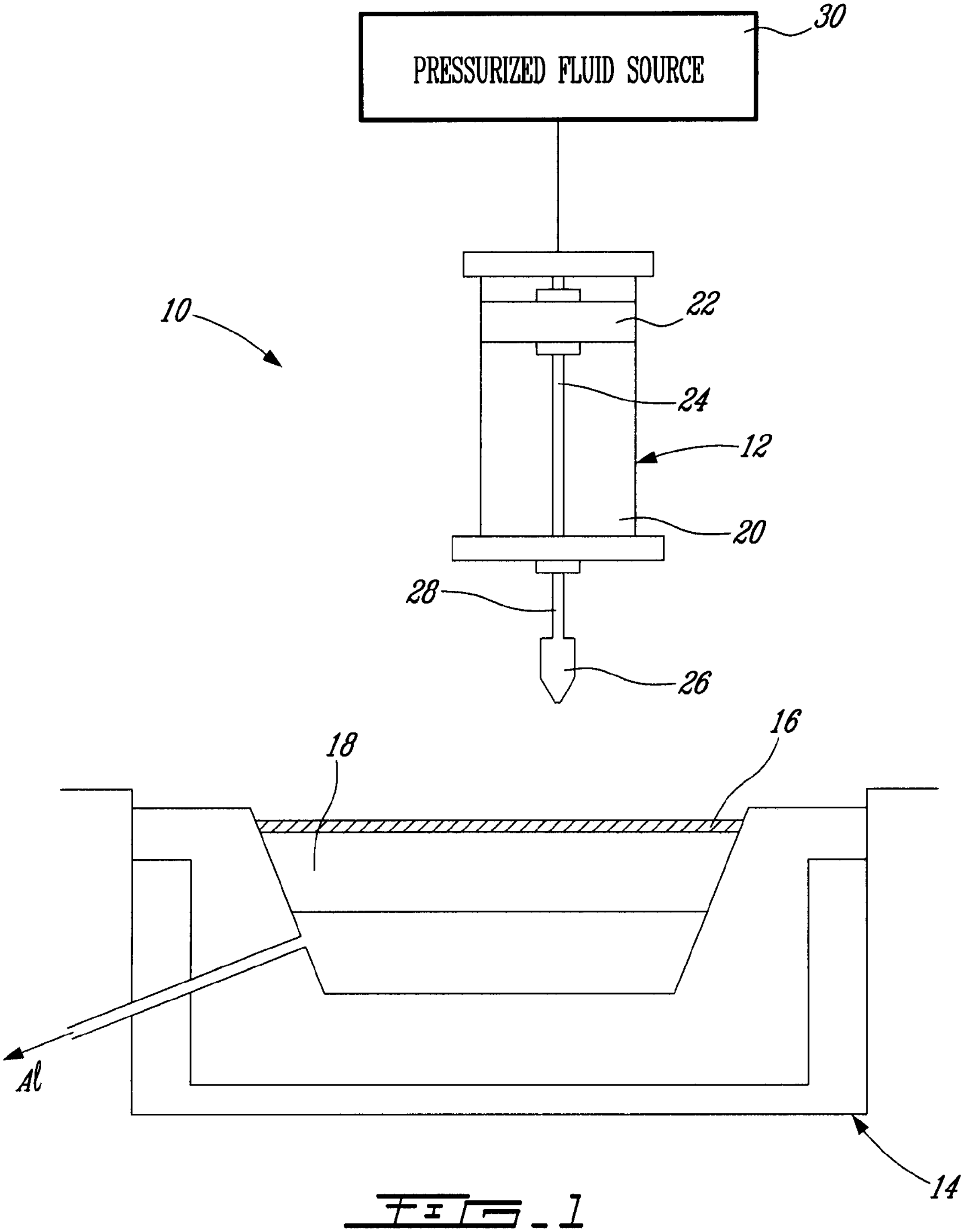
FIG. 1 is a schematic diagram of a smelting system for processing molten aluminium in accordance with an illustrative embodiment of the present invention.

Referring to FIG. 1, and in accordance with an illustrative embodiment of the present invention, an aluminium smelting system, generally referred to using the reference numeral 10, will now be described. The system 10 includes a pneumatic cylinder 12 illustratively positioned above a smelter pot 14 and used to break the crust 16 formed on top of the electrolytic bath 18 contained within the smelter pot 14. The cylinder 12 includes a tube 20, a piston 22 illustratively arranged for movement along a vertical stroke path (in the direction of a longitudinal axis of the cylinder 12, not shown) within the tube 20 and sealed against an internal circumferential surface of the tube 20, and a rod 24 fixedly attached to the piston 22. A crust-breaking tool 26, such as a pick or chisel, may be attached or integrally formed with the lower end 28 of the rod 24 and driven by the cylinder 12, thereby enabling engagement of the crust-breaking tool 26 with the crust 16 and withdrawal therefrom. For this purpose, the cylinder 12 is actuated by a pressurized flow of actuating fluid, which is supplied by the fluid source 30 to the cylinder 12 to initiate the descent of the piston 22, piston rod 24 and attached crust-breaking tool 26. In one exemplary embodiment, the actuating fluid is compressed air, although it will be appreciated that another actuating fluid, such as pressurized hydraulic fluid, may be substituted therefor. It will also be apparent to one of skill in the art that the pressure of the actuating fluid supplied by the source 30 varies according to design requirements. Typically, compressed air at approximately 105 pounds per square inch (psi) provides sufficient driving force to the piston 22, which then moves downwardly towards the smelter pot 14. Moreover, although the system 10 of the present invention is seen to have a particular application in actuators for aluminium smelting processes, it will be apparent to a person skilled in the art that the system 10 could have other broader applications as well.

Figure 2:
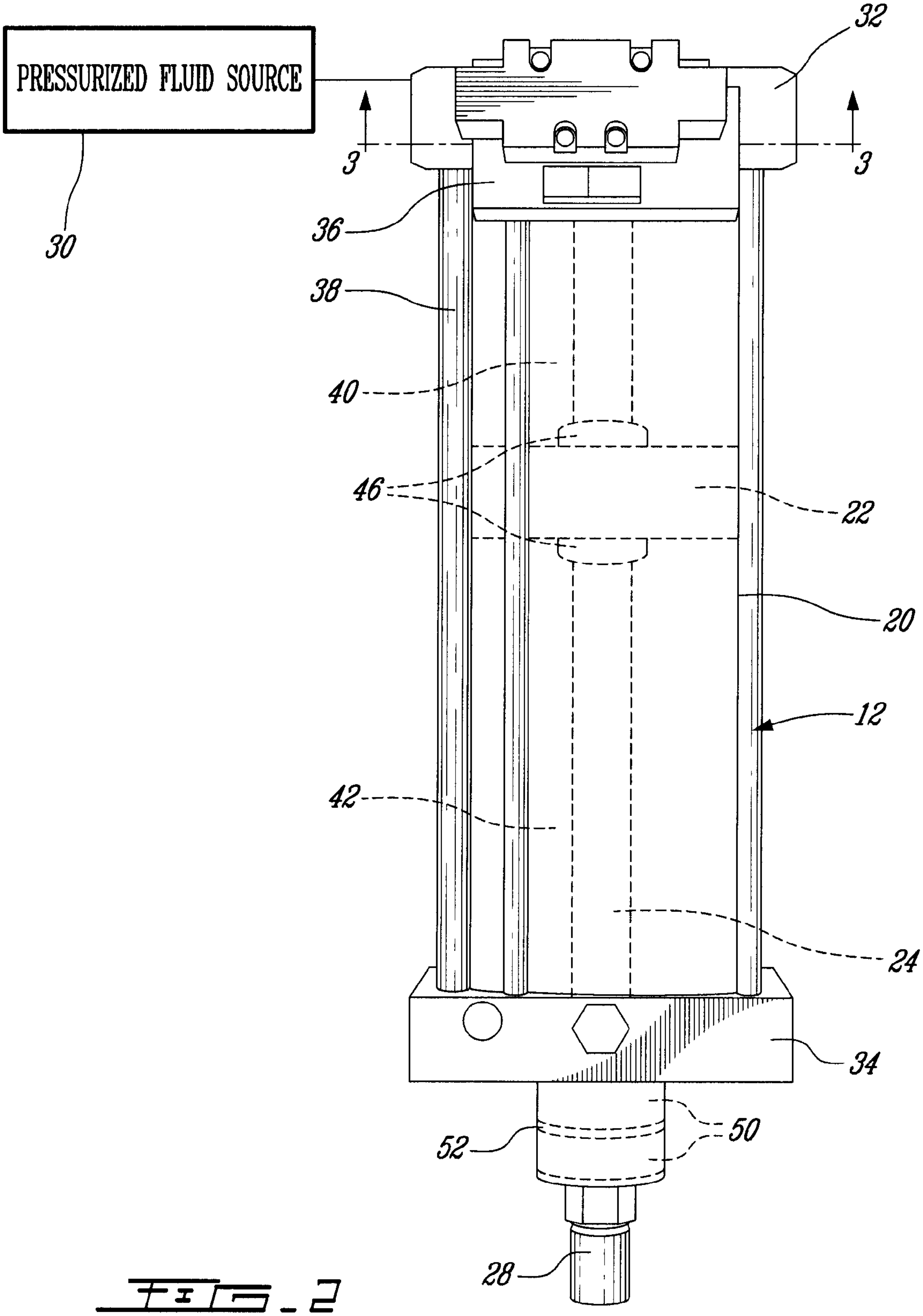
FIG. 2 is a side and partially sectional view of a pneumatic cylinder in accordance with an illustrative embodiment of the present invention.

Referring now to FIG. 2 in addition to FIG. 1, the cylinder 12 further includes a cap 32, which is attached to the upper end of the cylinder tube 20, and a head 34, which is attached to the lower end of the cylinder tube 20 and through which the lower end 28 of the rod 24 extends. A manifold 36 is further mounted on the cap 32 and a pipe 38 connects the cap 32 to the cylinder head 34. The manifold 36 typically uses an air inlet of three-quarters (¾) of an inch, which is sufficient for the operation of a large diameter cylinder, such as cylinder 12, illustratively having a diameter of eight (8) inches or 200 mm. This small air inlet enables a fast rise in pressure, as is typically desirable for proper operation of most cylinders.

When at rest, the piston 22 is maintained in an upper-most position within the tube 20 of the cylinder 12. As mentioned herein above, compressed air supplied to the cylinder 12 by the pressurized fluid source 30 enters the tube 20 and imparts force on the piston 22, which is then displaced to balance the force exerted onto it. In this manner, the motion of the piston 22 outlines a first chamber 40 defined by the inner wall of the tube 20, the upper side of the piston 22 and the lower face of the cap 32 and a second chamber 42 defined by the inner wall of the tube 20, the lower side of the piston 22 and the upper face of the cylinder head 34.

Referring back to FIG. 1 in addition to FIG. 2, once the crust-breaking tool 26 has perforated the crust 16, it is extracted from the smelter pot 14 by supplying compressed air to the second chamber 42 of the cylinder 12. The increased air pressure in the second chamber 42 causes the piston 22 to move back towards the cap 32, thus lifting the piston rod 24 and the attached crust-breaking tool 26 away from the smelter pot 14. Once the crust-breaking tool 26 has reached a position where it is free from the crust 16, the pressure required to raise the piston 22 to a position where the crust-breaking tool 26 is well clear from the smelter pot 14 and thus to return the crust-breaking tool 26 to its retracted position is substantially lower, i.e. about twenty (20) psi, than the pressure initially required to drive the piston 22, i.e. about 105 psi. Indeed, this lower pressure, illustratively of about twenty (20) psi, is typically sufficient for this purpose and it is not necessary to continue supplying compressed air to the chamber 42 after extraction of the crust-breaking tool 26.

Figure 3:
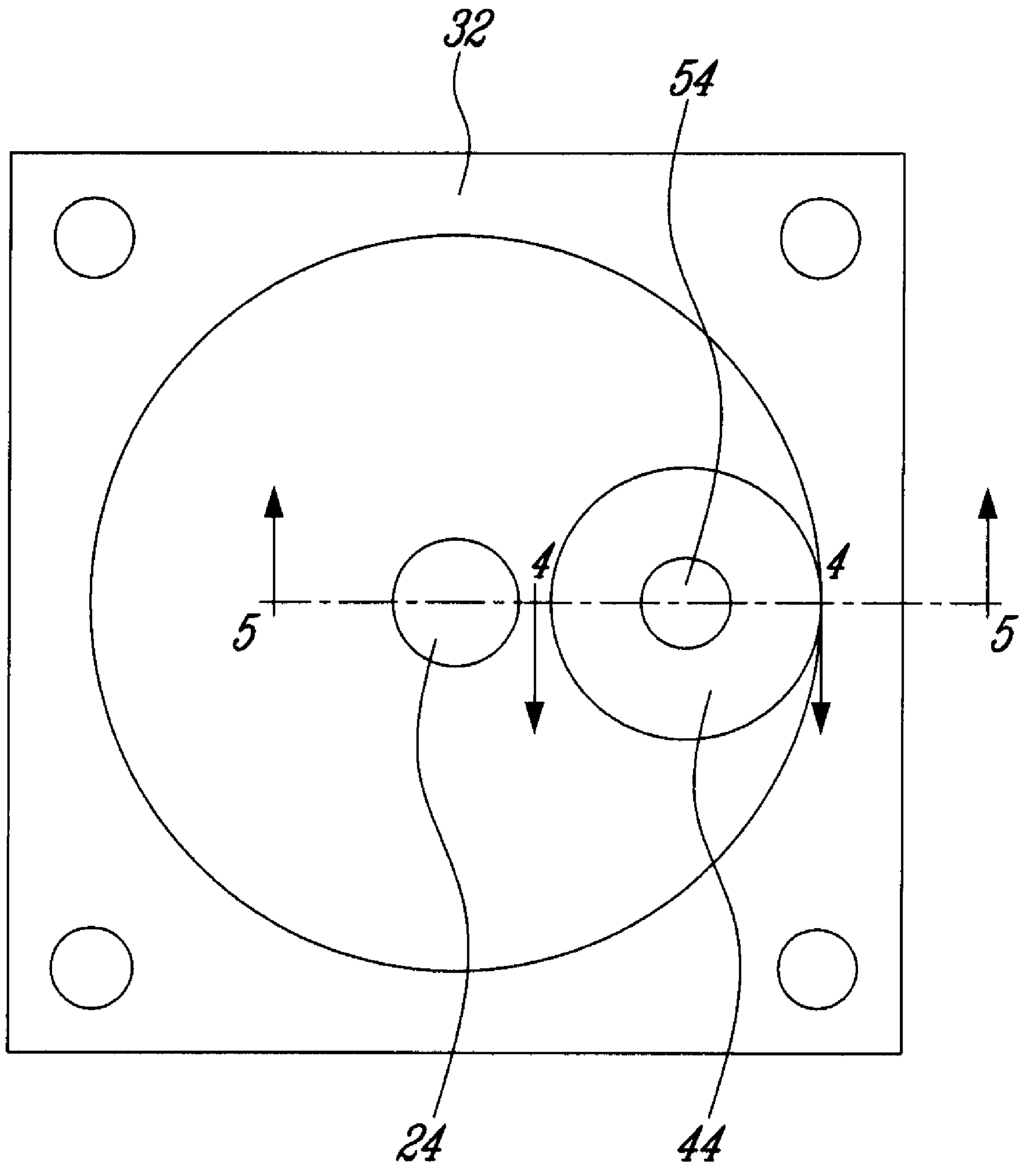
FIG. 3 is a sectional view along line 3-3 in FIG. 2.
Figure 4:
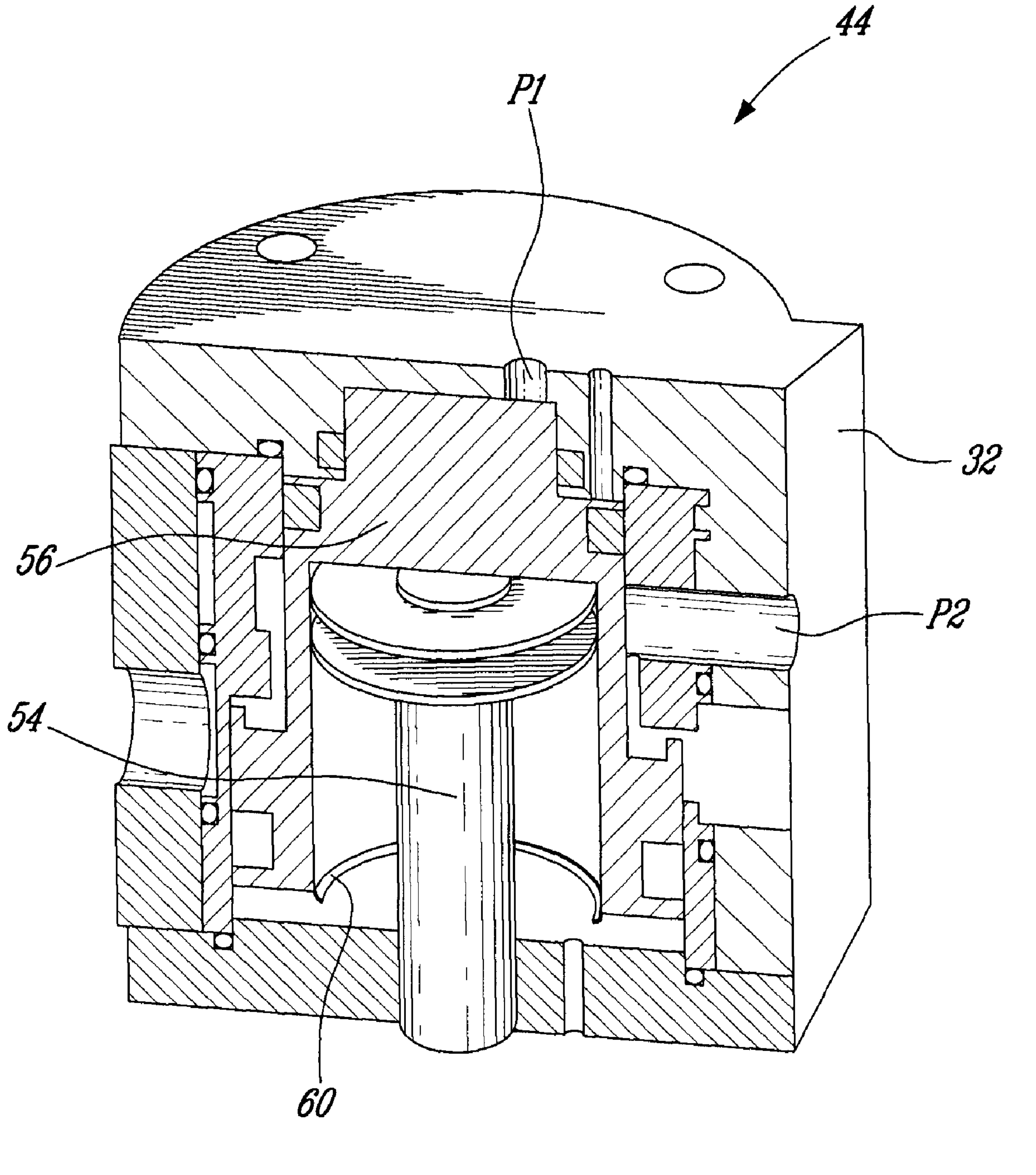
FIG. 4 is a perspective view along line 4-4 in FIG. 3.

Referring now to FIG. 3 in addition to FIGS. 1 and 2, a valve 44, which is connected to a manifold 36 mounted on the cap 32, is thus used to close the air supply once the crust-breaking tool 26 is in a position clear from the smelter pot 14. The manifold 36 includes a directional valve that eliminates the need for unnecessary piping in the cylinder 12 and as a result increases the operating speed of the cylinder 12 while decreasing compressed air consumption. By calibrating an orifice of illustratively 0.281 inches (7.1 mm) in a key location on the manifold 36, the pressure within the cylinder 12 can be illustratively reduced to about twenty (20) psi, i.e. four (4) or five (5) times lower than the maximum consumption of the system 10, which is illustratively 105 psi as mentioned herein above, while maintaining a maximum cycle time of four (4) seconds, as typically required for aluminium smelting processes. The restricted air feed to the cylinder 12 prevents pressure from building-up on the driving side of the piston 22 to a higher level than is actually needed for the piston 22 to perform a working stroke.

Referring back to FIG. 2 in addition to FIGS. 1 and 3, cushion pistons 46 are placed on the upper and lower side of the piston 22 to eliminate noise and shock vibrations inside the cylinder 12 while providing smooth deceleration of the piston 22. When the piston 22 has been lowered towards the smelter pot 14 till it reaches the cylinder head 34, the lower cushion piston 46 enters a seal cushion 48 integrated into the cylinder head 34. This initiates a cushioning process, which also occurs at the upper end of the cylinder 12 towards the end of the stroke of piston 22, when the latter is being raised away from the smelter pot 14 and the upper cushion piston 46 penetrates the seal cushion 48 (shown in FIGS. 5*a* to 5*f*) integrated into the cap 32. When either cushion piston 46 is in operation however, the pressure inside the cylinder 12 increases to a maximum, i.e. illustratively 105 psi, as resistance to piston movement becomes higher. A potential leak appearing at the end of the piston's stroke and typically due to a defect of the rod lips seals 50 located inside the rod gland 52, would therefore occur at high pressure. This would result in the need for an increased consumption of compressed air in order to compensate for the leakage and prevent malfunction of the cylinder 12. In the long run, this increased air consumption might affect the operation of the cylinder 12 and require maintenance or even a shutdown of production of the related smelter pot 14. In order to prevent an increase in pressure at the end of the stroke of the piston 22, the valve 44 closes the air supply to the cylinder 12 not only while the piston 22 is being raised, as discussed herein above, but also before either cushion piston 46 of the piston 22 reaches its respective seal cushion 48. As described in further detail herein below, this closing of the valve 44 is controlled by the lifting pressure of the cylinder 12 and actuated by the piston 22 while the opening of the valve 44 is actuated by the differential pressure within the valve 44. As mentioned herein above, once the valve 44 is closed, the pressure within the cylinder 12 is significantly reduced, illustratively to about twenty (20) psi, relative to the pressure used to initially drive the piston 22, i.e. the maximum consumption of the system 10. As a result, in the present invention, a leak occurring at the rod lip seals 50 of the cylinder 12 would be at this reduced pressure, requiring only a lower consumption of compressed air to compensate for the leakage. This results in important energy savings as a plurality of cylinders, illustratively up to 3,000, are typically in operation at one time in a single aluminium plant.

Now referring to FIGS. 4 and 5*a* to 5*f* in addition to FIG. 2, the valve 44 includes a first piston 54 having a surface S1, a second piston 56 having a surface S2, three (3) passages or openings P1, P2, and P3 adjacent to the pistons 54 and 56 used as air inlets and/or outlets as described further herein below, three small orifices 58, a snap-ring 60, which is located underneath the first piston 54 and has the property of increasing its diameter by elastic deformation, and an o-ring 62 located on a surface S3 of the valve 44 and used to ensure proper sealing at S3 when the valve 44 is closed. Illustratively, the pistons 54 and 56 are made of steel while the snap-ring 60 and o-ring 62 are made of fluorocarbon rubber such as Viton™.

Figure 5A:
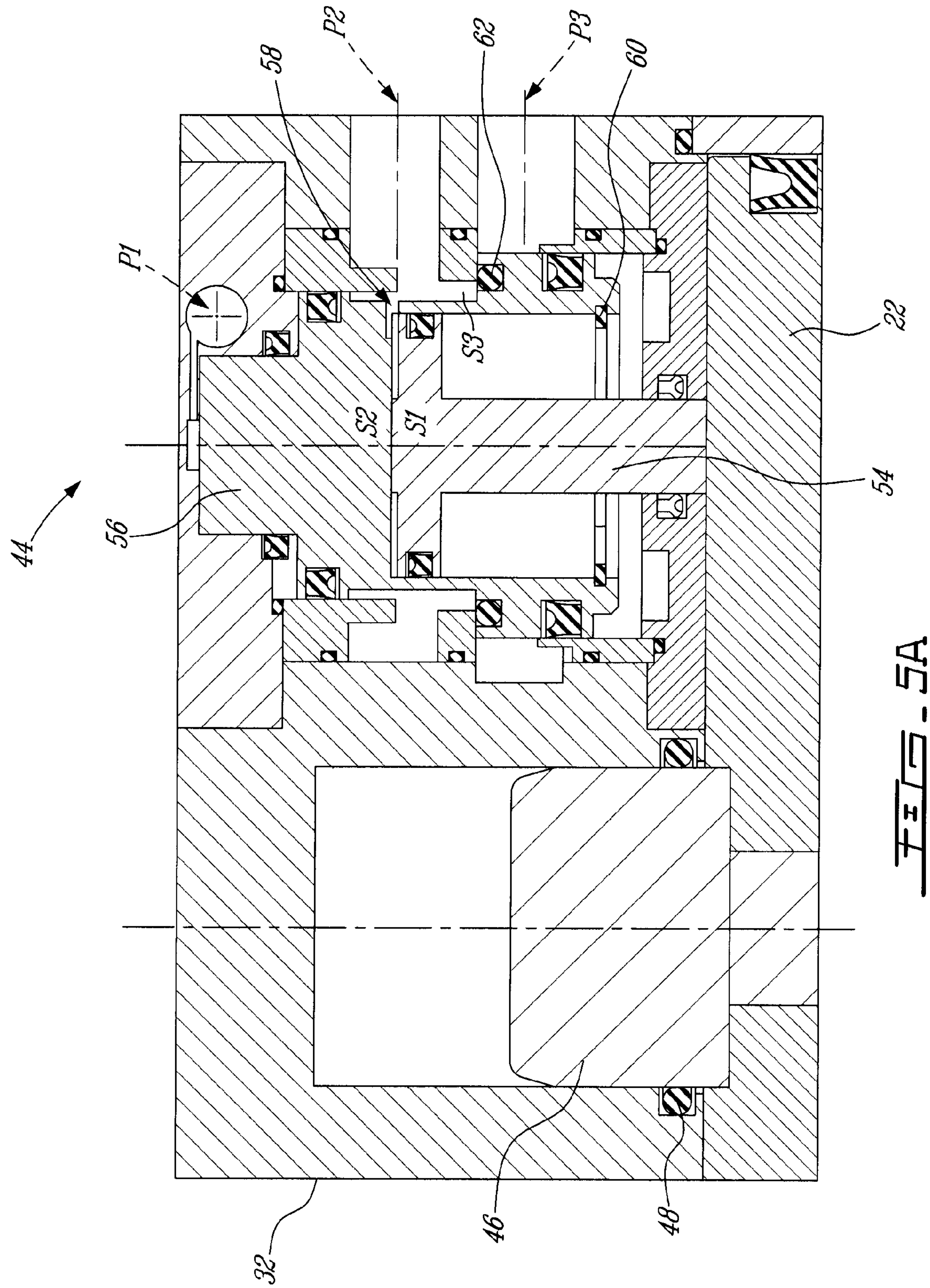
FIG. 5*a* is a partial sectional view along line 5-5 in FIG. 3 with the piston in the rest position and the valve closed in accordance with an illustrative embodiment of the present invention.

Referring now to FIG. 5*a* in addition to FIG. 2, when at rest in the uppermost position, the piston 22 leans against the first piston 54 of the valve 44. To initiate the downward movement of the piston 22, compressed air is supplied to the first chamber 40 of the cylinder 12 through the opening P1. At this point, the valve 44 is closed through the o-ring 62 (with the o-ring 62 being in alignment with the opening P3 to provide a seal at the interface between the surface S3 and an inner surface of P3) and prevents air in the second chamber 42 from being vented. However, due to the vertical orientation of the cylinder 12, the larger pressurized area in the first chamber 40 at the rear end of the piston 22 as compared to the second chamber 42 at the front end, as well as the total weight of the piston 22, piston rod 24 and attached crust-breaking tool 26, the piston 22 will undergo an initial downward movement.

Figure 5B:
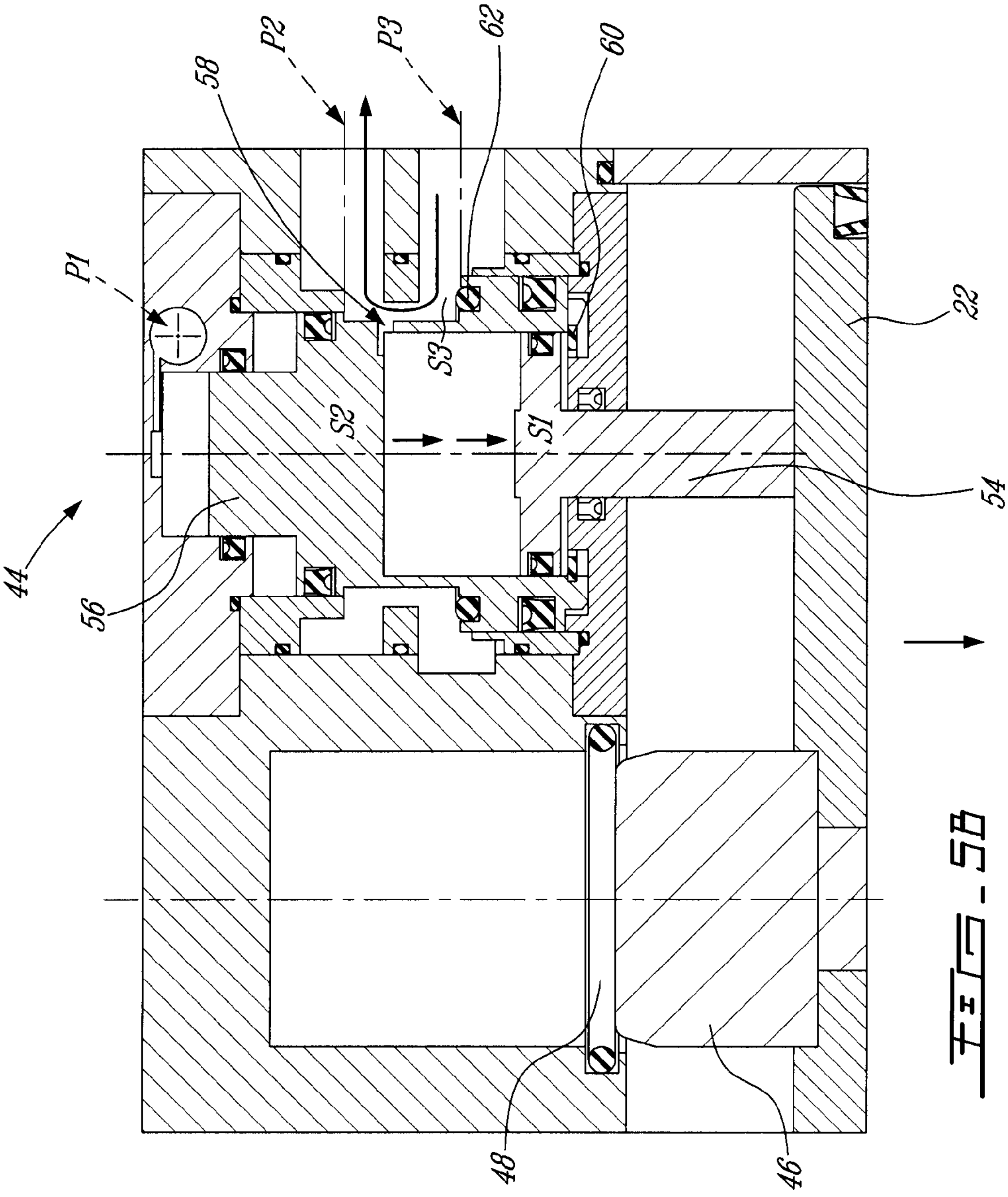
FIG. 5*b* is a partial sectional view along line 5-5 in FIG. 3 with the valve open as the descent of the piston towards the extended position is being initiated in accordance with and illustrative embodiment of the present invention.

Referring now to FIG. 5*b*, to propel the piston 22 further down, air from the second chamber 42 needs to be vented by opening the valve 44. Since the air pressure applied at P1 not only applies to the piston 22 but also to the second piston 56 of the valve 44, pressure is applied to the second piston 56, which also moves downward, thus pushing the first piston 54 along. The downward movement of the first piston 54 opens the valve 44 by releasing the seal created by the o-ring 62, thus allowing air from second chamber 42 underneath the piston 22 to pass through the pipe 38 and reach the cap 32 where it is expelled through the opening P2 via opening P3.

Figure 5C:
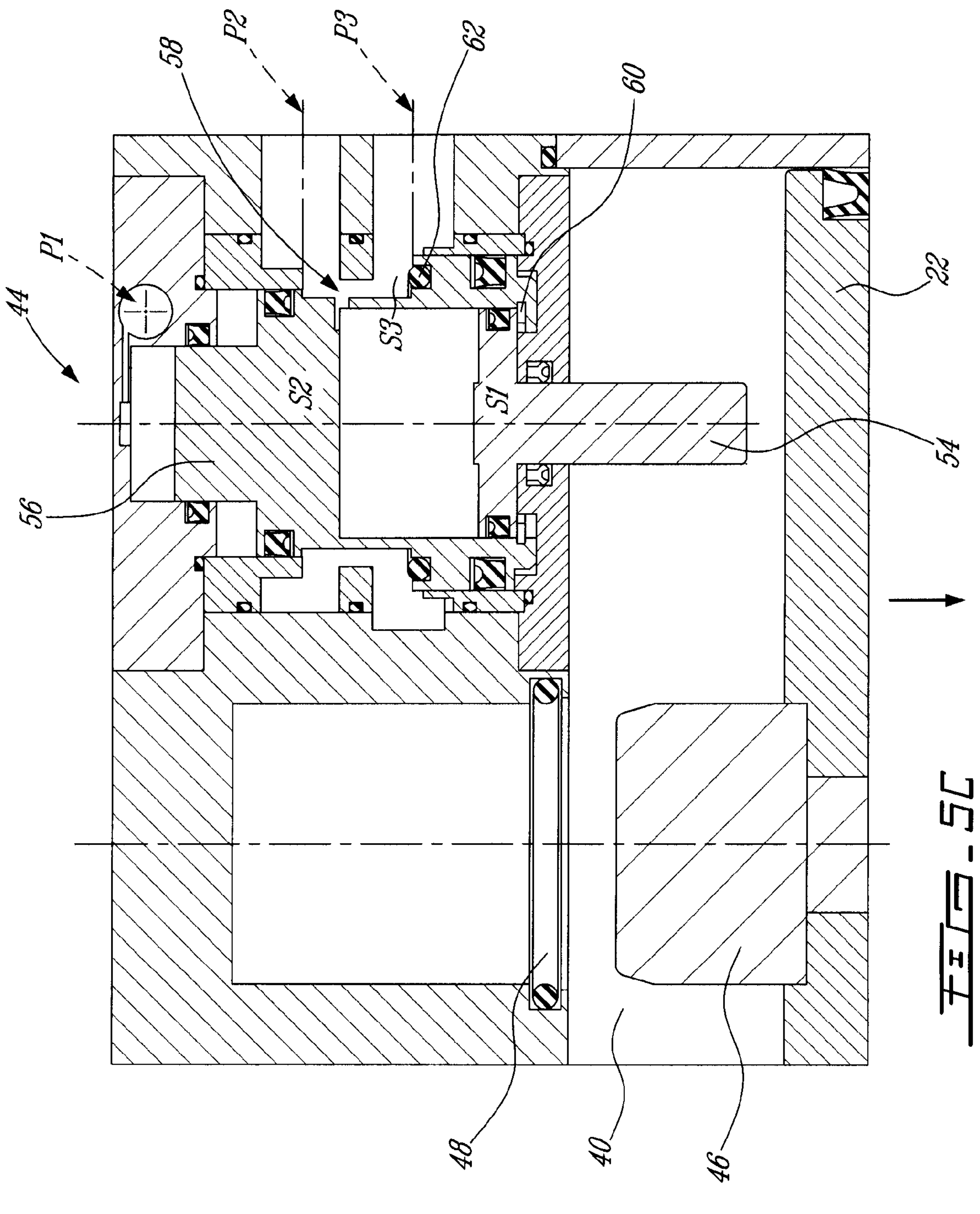
FIG. 5*c* is a partial sectional view along line 5-5 in FIG. 3 with the valve open during the descent of the piston towards the extended position in accordance with an illustrative embodiment of the present invention.

Referring now to FIG. 5*c*, thereafter, the piston 22 moves further down and eventually reaches its fully extended position, thus enabling a crust-breaking working stroke. Meanwhile, the first piston 54, which undergoes a downward movement until it reaches and leans against the snap-ring 60, extends into the first chamber 40 of the cylinder 12 by a distance equivalent to the length of the cushion piston 46.

Figure 5D:
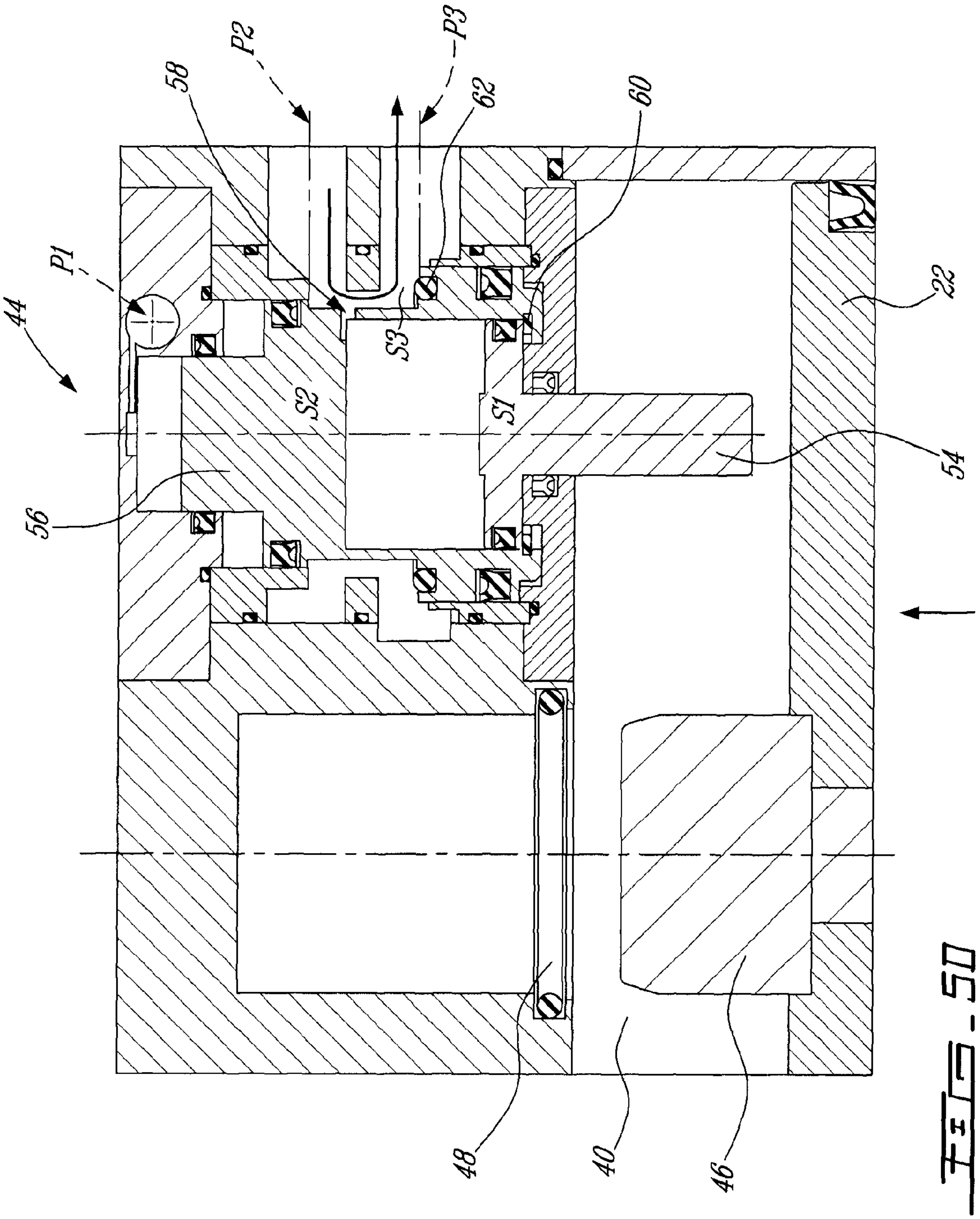
FIG. 5*d* is partial sectional view along line 5-5 in FIG. 3 with the valve open as the lifting of the piston away from the extended position is being initiated in accordance with an illustrative embodiment of the present invention.

Referring now to FIG. 5*d* in addition to FIGS. 1 and 2, once the crust-breaking tool 26 has pierced the crust 16, it is lifted away from the smelter pot 14 by reversing the movement described herein above. For this purpose, the piston 22, and thus the crust-breaking tool 26 attached thereon, is lifted towards the cap 32 by supplying compressed air to the second chamber 42 through the opening P2. As this air pressure applies to the surface S3 of the o-ring 62 as well as to the surface S1 of the piston 54 through orifices 58, it maintains the valve 44 open at S3, thus allowing the air pressure applied at P2 to be directed through the opening P3 towards the head 34 of the cylinder 12 via the pipe 38. This air supply increases the pressure in chamber 42, thus enabling the piston 22 to rise up towards the cap 32 of the cylinder 12. Meanwhile, the first piston 54 of the valve 44 is still leaning against the snap-ring 60 and extending into the first chamber 40 as a result of the previous downward movement of the piston 22, as described herein above. As long as the piston 54 leans on the snap-ring 60, the air pressure incoming at P2 on the surface S1 of the piston 54 has no effect on the latter and is instead applied on the surface S2 of the piston 56, which undergoes an upward movement.

Figure 5E:
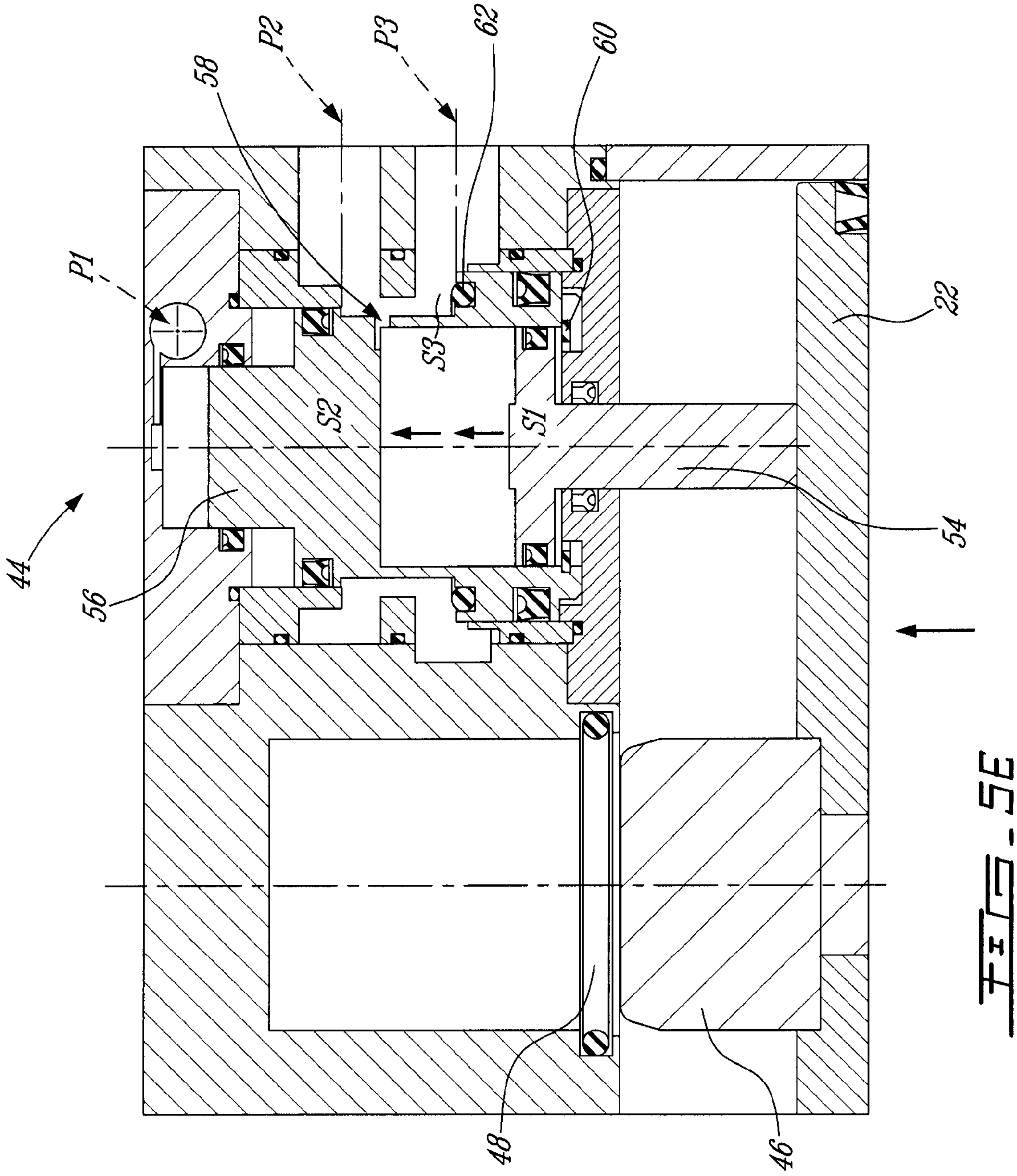
FIG. 5*e* is partial sectional view along line 5-5 in FIG. 3 with the valve open during the lifting of the piston away from the extended position in accordance with an illustrative embodiment of the present invention.
Figure 5F:
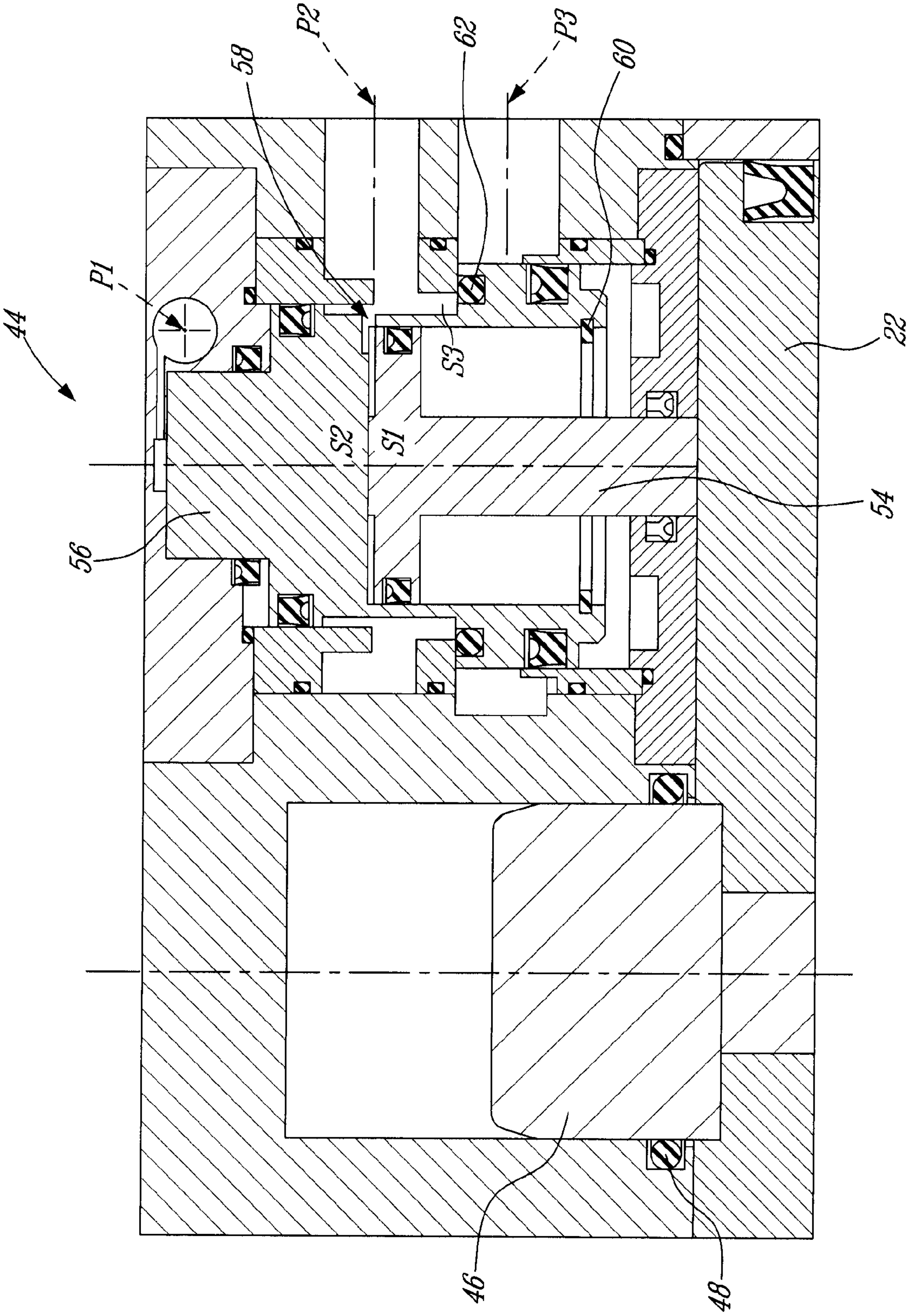
FIG. 5*f* is a partial sectional view along line 5-5 in FIG. 3 with the piston raised from the extended position to the rest position and the valve closed in accordance with an illustrative embodiment of the present invention.

Referring now to FIGS. 5*e* and 5*f*, while the valve 44 remains open, the piston 22 keeps rising towards the cap 32 until it reaches the small piston 54 towards the end of its stroke and pushes it along. The first piston 54 is therefore lifted off the snap-ring 60 and undergoes an upward movement towards the piston 56 (until the surfaces S1 and S2 abut as shown in FIG. 5*f*), thus closing the valve 44 through the o-ring 62. At this point, the piston 22 has reached the end of its stroke and the cushion piston 46 has penetrated the seal cushion 48. As air is no longer supplied to the cylinder 12, the piston 22 remains in this uppermost rest position until the next stroke.

Referring back to FIGS. 5*e* and 5*f* in addition to FIG. 1, towards the end of the stroke of the piston 22 when the first piston 54 is lifted off the snap-ring 60 and the valve 44 is closed, if an inadvertent loss of pressure occurs within the chamber 42 due to a leak, the piston 22, which is in the uppermost rest position shown in FIG. 5*f*, begins to move downwards. In order to lift the piston 22 back to and maintain it in its rest position, compressed air is applied at P2 to compensate for the leakage and acts on surface S1, resulting in a downward movement of the first piston 54 until the latter leans back against the snap-ring 60. The pressure acting on both surfaces S1 and S3 further generates forces leading to the opening of the valve 44, thus allowing air to flow between the o-ring 62 and its seat. As the valve 44 is open, compressed air can be expelled through P3 towards the head 34 of the cylinder 12 and the piston 22 is propelled upwards until it leans against piston 54, which it pushes along, thus lifting the piston 54 off the snap-ring 60 once again and closing the valve 44. As mentioned herein above, while the piston 22 is being raised, it operates at a reduced pressure of illustratively about twenty (20) psi. Any leak occurring at the rod lips seals 50 during this operation would therefore be at a pressure between twenty (20) psi and six (6) psi, which is the minimum pressure required to maintain the piston 22 in a raised position. As each crust-breaking operation illustratively occurs every two (2) minutes, if the time required to decrease the pressure within the cylinder 12 from twenty (20) psi to six (6) psi is greater than two (2) minutes, there will be no need for any additional air consumption to drive the piston 22. Indeed, the leak will decrease the pressure in chamber 42, thus promoting the subsequent crust-breaking action by initiating the downward movement of the piston 22 and increasing its speed of descent. Consequently, the cylinder 12 can still operate despite of any fluid leakage.

Referring back to FIGS. 1 and 2, an electromagnetic sensor (not shown) may illustratively be incorporated into the cylinder head 34. The sensor would act at the end of the stroke of the piston 22 by sensing when the latter reaches the extended position. The sensor would then enable the flow of compressed air to be quickly reversed, thus preventing an increase in pressure. It is desirable to use an electromagnetic sensor instead of an electronic sensor since the latter is typically unable to operate reliably due to the important magnetic fields generated by electrodes, which operate at high amperage in the electrolyte bath 18.

Although the present invention has been described hereinabove by way of specific embodiments thereof, it can be modified, without departing from the spirit and nature of the subject invention.

The invention claimed is:

1. A valve assembly for controlling the supply of pressurized fluid to a piston slidably disposed within an actuating cylinder for movement along a longitudinal axis thereof between a rest position where the piston is adjacent a first end of the cylinder and an extended position where the piston is adjacent a second end of the cylinder, the valve assembly comprising: a first passage provided at the first end for enabling a flow of the fluid within the cylinder during operation, a pressure of the fluid applying to alternative driving sides of the piston for alternatively moving the piston between the rest position and the extended position; a first valve piston mounted at the first end adjacent said first passage for movement along a direction substantially parallel to the axis, said first valve piston comprising a first surface and a projecting member extending away from said first surface towards the second end along said direction; a second valve piston mounted adjacent said first valve piston for movement along said direction and comprising a second surface adapted to cooperate with said first surface; and a sealing member positioned adjacent said first passage and operatively connected to said first valve piston for movement therewith along said direction; wherein upon reaching the rest position the piston contacts said projecting member for propelling said first valve piston along said direction towards said second valve piston and abutting said second surface against said first surface, thereby moving said sealing member in alignment with said first passage for providing a seal at an interface between an outer surface of said sealing member and an inner surface of said first passage and stopping said fluid flow; and further wherein when the piston is moved from the rest position to the extended position, the fluid drives said abutting first and second valve pistons along said direction towards the second end and brings said second surface out of abutment with said first surface, thereby moving said sealing member out of alignment with said first passage and releasing said seal for enabling said fluid flow.

2. The valve assembly of claim 1, wherein the actuating cylinder is a pneumatic cylinder comprising a rod fixedly attached to the piston and a crust-breaking tool attached to an end of said rod adjacent the first end for breaking a crust formed on top of a smelter pot.

3. The valve assembly of claim 2, wherein in the rest position said crust-breaking tool is clear from said smelter pot and in the extended position, said crust-breaking tool is driven into said crust of said smelter pot.

4. The valve assembly of claim 1, wherein the fluid is compressed air supplied by a fluid source.

5. The valve assembly of claim 1, further comprising a second passage, said first passage enabling said fluid flow to a first one of said alternative driving sides for moving the piston to the extended position and said second passage enabling said fluid flow to a second one of said alternative driving sides for returning the piston to the rest position.

6. The valve assembly of claim 1, wherein said sealing member is an o-ring.

7. The valve assembly of claim 1, further comprising a snap-ring mounted about said first valve piston.

8. The valve assembly of claim 1, wherein upon stopping said fluid flow as the piston reaches the rest position a pressure of the fluid within the cylinder is at least sufficient to substantially maintain the piston in the rest position.

9. The valve assembly of claim 8, wherein upon stopping said fluid flow as the piston reaches the rest position any leakage of the fluid occurs at said pressure of the fluid within the cylinder at least sufficient to substantially maintain the piston in the rest position.

10. The valve assembly of claim 8, wherein said pressure of the fluid within the cylinder is reduced compared to said pressure of the fluid applied to said alternative sides of the piston for alternatively moving the piston between the rest position and the extended position.

11. The valve assembly of claim 10, wherein said pressure of the fluid within the cylinder is 20 pounds per square inch and said pressure of the fluid applied to said alternative sides of the piston for alternatively moving the piston between the rest position and the extended position is 105 pounds per square inch.

12. The valve assembly of claim 1, further comprising a first and a second seal cushion positioned adjacent the first end and the second end, said first and second seal cushion each providing a smooth deceleration of the piston and absorbing vibration and noise as the piston respectively reaches the rest position and the extended position.

13. The valve assembly of claim 12, wherein the piston comprises a first and a second cushion piston mounted on said alternative driving sides thereof for respectively penetrating said first and said second seal cushion as the piston respectively reaches the rest position and the extended position.

14. The valve assembly of claim 1, wherein said valve assembly is mounted to a manifold provided on a cap attached to the first end of the cylinder.

15. The valve assembly of claim 1, further comprising a directional valve for directing said flow of the fluid within the cylinder to said alternative driving sides.

16. The valve assembly of claim 1, further comprising an electromagnetic sensor provided at the second end for sensing when the piston reaches the extended position and controlling a reversal of said fluid flow between said alternative driving sides.

17. The valve assembly of claim 1, further comprising a plurality of orifices positioned adjacent said first surface for enabling said pressure of the fluid to apply on said first surface for maintaining said sealing member out of alignment with said first passage and enabling said fluid flow when the piston is returned from the extended position to the rest position.

* * * * *